Nov. 22, 1949    R. J. HERBOLD    2,489,221
CRAFT LOCATING APPARATUS
Filed June 26, 1945    4 Sheets-Sheet 1

Inventor
Robert J. Herbold
By Clayton R. Jenks
Attorney

Nov. 22, 1949 R. J. HERBOLD 2,489,221
CRAFT LOCATING APPARATUS
Filed June 26, 1945 4 Sheets-Sheet 2

ROBERT J. HERBOLD Inventor

Nov. 22, 1949 — R. J. HERBOLD — 2,489,221
CRAFT LOCATING APPARATUS
Filed June 26, 1945 — 4 Sheets-Sheet 3

Inventor
Robert J. Herbold
By Clayton R. Jenks
Attorney

Nov. 22, 1949 R. J. HERBOLD 2,489,221
CRAFT LOCATING APPARATUS
Filed June 26, 1945 4 Sheets-Sheet 4

Inventor
Robert J. Herbold
By Clayton L. Jenks
Attorney

Patented Nov. 22, 1949

2,489,221

UNITED STATES PATENT OFFICE 2,489,221

CRAFT LOCATING APPARATUS

Robert J. Herbold, Denver, Colo., assignor to Lafayette M. Hughes, Denver, Colo.

Application June 26, 1945, Serial No. 601,686

9 Claims. (Cl. 33—46)

This invention relates to mechanism for the guidance of craft, and more particularly to a device which will aid the pilot in holding his craft in proper formation in spite of clouds, fog and adverse weather conditions which prevent him from seeing the accompanying craft.

When aircraft are flying together in large numbers, it is essential that they maintain a geometrical formation for their guidance and to prevent collisions, or if they are in combat, to maintain a certain protective association with one another. However, when passing through extensive and dense clouds, the pilots cannot see the beacons on other craft, and while flying blind may get out of formation with serious results; and it is sometimes found that a pilot may be so confused by the darkness of the heavy clouds, whether during the day or night, that he loses his sense of direction and may get entirely away from the formation and become lost. For many reasons, it is often imperative that the pilot maintain either a visual or an instrument contact with the adjacent or associated aircraft during flight. The same considerations apply to boats at sea which are required to travel in a convoy or through a tortuous channel entrance to a harbor or otherwise to maintain a desired position relative to other boats or objects carrying beacon or guiding lights.

The primary object of this invention is to provide apparatus which informs the pilot of a craft as to the location of a guiding beacon and thereby aid him in maintaining a proper course.

A further object of the invention is to provide a craft with a guidance instrument which figuratively sees identifying beacon signals on accompanying craft and gives the pilot an indication as to the directive location of the other craft.

A further object of the invention is to provide a guidance instrument which determines the directive positions of guiding beacons on associated craft and triangulates their angular directions into an indication of the approximate distance thereof.

Another object of the invention is to provide aircraft with guidance instruments which will give the pilot an indication of the positions of aircraft which are flying at the same elevation or in planes above or below him, and which will guide him in maintaining a proper flight formation while he is flying blind through dense clouds or at night. Further objects will be apparent in the following disclosure.

In accordance with my invention, I propose to employ two spaced photo sensitive elements on a craft which pick up and indicate the direction of a guiding light beacon, and by triangulation of the angles of the two directive lines to the beacon show approximately the position and the distance thereof. In the application of this principle to the guidance of aircraft in flight formation or of boats in a convoy, I provide a light beacon on each craft which is so located as to be seen from an adjacent craft; and each craft is provided with several photo sensitive elements and associated electrical apparatus which are so constructed and arranged that indicating devices governed by the photo elements give the required location of the beacon on another craft. These indications are determined by a variation in electrical characteristics of the circuit which change with a change in the angularity of direction of the light ray that strikes the receiving photosensitive element. For this purpose, I prefer to employ the type of apparatus shown in my co-pending application, Serial Number 582,918 filed March 15, 1945, but I may utilize the constructions shown in my other co-pending applications #562,353, filed November 7, 1944, and #570,169, filed December 28, 1944, and which are modified as herein described in order to give the desired indication or guidance control of the pilot or the craft.

Referring to the drawings which illustrate a preferred embodiment of this invention as applied to the guidance of aircraft in flight formation.

Figures 1, 2:
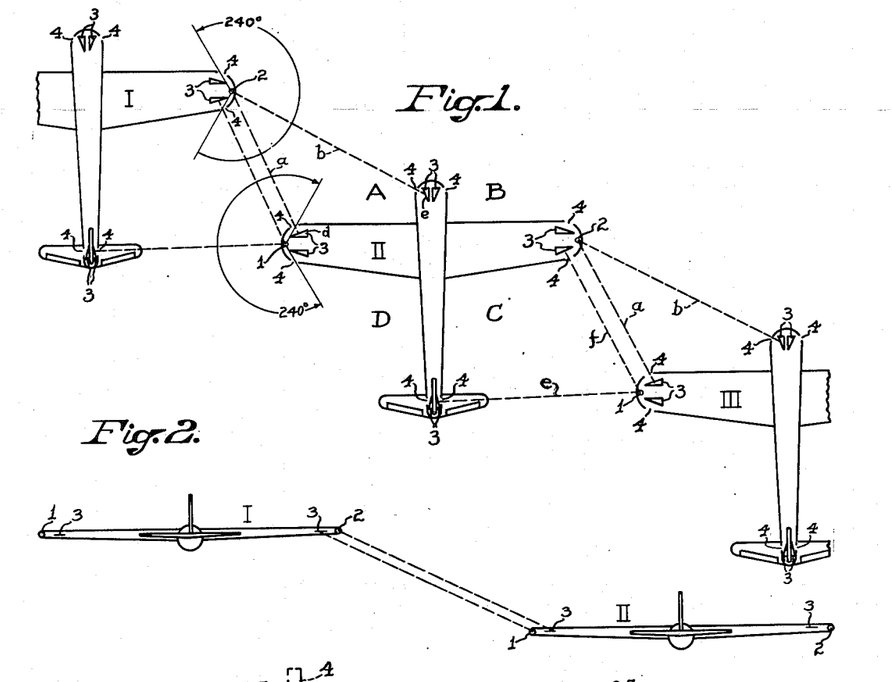
Fig. 1 is a diagrammatic plan view of three aircraft carrying the beacons and photosensitive pick-up elements and illustrating the principles involved in holding the craft in flight formation.
Fig. 2 is a vertical rear elevation of two of the craft of Fig. 1.

The main principles of a specific embodiment of this invention are illustrated in Figs. 1 and 2 which show diagrammatically the relationship of three aircraft in flight formation. These craft, designated by the numerals I, II and III, are each provided with two beacon lights 1 and located adjacent to the tips of its wings and on a line at right angles to the direction of flight. The lights, which may be electric bulbs of 50 or more candle power, such as are used for automobile headlights, and which preferably give a high emission of infrared rays, are so mounted (see Figs. 14 and 15) that they may be observed from opposite sides of the aircraft only within a 40° spherical angle directed outwardly; and the beacons are unobstructed so that each may be seen from above and below as well as laterally within that angle. The beacon lights are obscured within the remaining spherical angle of 20°, so that only one light will be picked up normally by the observing craft on either side thereof. Two pairs of photosensitive elements 3 and associated electrical apparatus are so located and shielded in each quadrant on each of the aircraft that they will simultaneously pick up one of the two beacon lights on the wings of the next adjacent craft and through suitable electrical instruments indicate the angular direction of the light. The electrical apparatus also triangulates automatically the two observed directions of the beacon light into an indication of its position or distance and the location or altitude above or below the observing craft. A third pair of photo elements (Fig. 2) in each quadrant gives the relative elevation.

The eight pairs of photo-sensitive elements 3, designated in Fig. 1 by small triangles, are preferably mounted on each side of the nose and in the tail of the aircraft and at the front and the rear of each wing tip; and these are shielded by screens having slots 4 therein which give an optical vision, as it were, of all possible locations of the beacons. Each photo element (see Fig. 14) has a spherical angle of vision of 125°, more or less as desired, so that the two pairs of photo elements facing into a given quadrant can pick up a beacon within that quadrant. The angle between the lines a and b, taken with the distance between the photo elements d and e on craft II, will serve for calculating the distance, as well as indicating the direction, of light 2 on craft I. Similarly, craft I can determine the distance and location of beacon 1 of craft II by means of the rear photo elements in the right wing and the right hand elements in the tail. Thus each craft has an instrument vision of a beacon on the craft on each side of it. These or other photo sensitive elements may be mounted on the craft in any desired locations to insure having no blind spots.

In order that the directive angularity of the beacons may be determined automatically, I may use photosensitive elements of the photoemissive, photoconductive or photovoltaic type, which are so constructed and arranged that an electrical characteristic is varied with the direction of a light ray impinging thereon. The construction herein described is a photoemissive element so shaped and arranged relative to the slot 4 in its shield that the electron emission and the resultant current in an amplifier circuit is varied as the angle of incidence of the light ray changes.

Figures 3, 4:
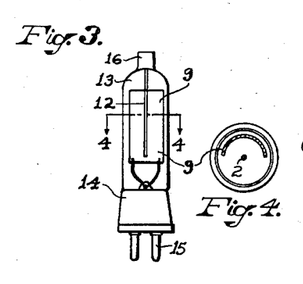
Fig. 3 is a vertical elevation of a standard photosensitive tube.
Fig. 4 is a transverse section on the line 4—4 of Fig. 3.

Referring first to Figs. 3 and 4, I have there illustrated a standard photosensitive tube of the electron emissive type which comprises a cathode 9 that may be rectangular and bent to a partial cylindrical concave shape. The anode 12, which may be a vertical wire, is arranged at the axis of the cathode arc. The two electrodes are suitably arranged in an evacuated or gas filled tube 13 made of glass or other material provided with a base 14 and the supporting prongs 15. One prong may be electrically connected with the cathode, and the anode may be connected with a cap 16 at the top of the tube. The photosensitive inner surface of the cathode may have a coating of a suitable metal, comprising lithium, sodium, potassium, rubidium or caesium, the choice of which depends largely upon the type of light to be received. For light from a standard electric light bulb, and particularly one which gives a high emission of infra red rays, as is preferred, the cathode may be made of a base metal of silver coated with caesium on caesium oxide.

Figures 5, 6:
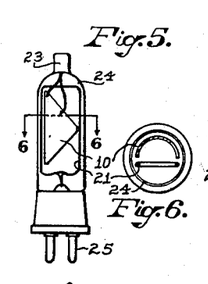
Fig. 5 is a vertical elevation of a new type of photo tube having a triangularly shaped cathode.
Fig. 6 is a section on the line 6—6 of Fig. 5.
Figure 9:
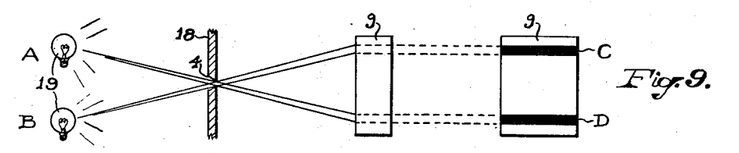
Fig. 9 is a diagrammatic view showing how a light in two positions A and B may activate different but equal areas of the cathode of a standard phototube of Fig. 3, the right hand portion of the figure showing the cathode turned at right angles to illustrate the area of activation.
Figure 10:
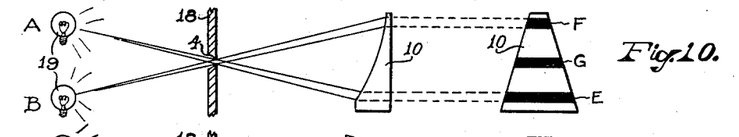
Fig. 10 is a similar diagrammatic view showing the relationship of the two positions of the light to the activated areas of the triangular cathode of Fig. 7.
Figure 11:
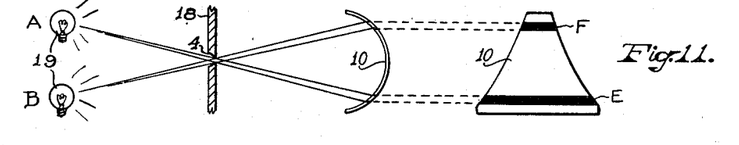
Fig. 11 is a similar view showing the activated areas on the cathode of Fig. 5.

If that standard tube of Figs. 3 and 4 is connected in a suitable circuit, as will be explained, and if the cathode receives light rays through an elongated aperture 4 (Fig. 9) in a wall 18, then when the light source 19 is moved from position A to position B, the light rays will fall upon equal areas C and D of the cathode 9, disregarding the angles of incidence of the rays, and the electron emission will be the same for either angular position of the light. If, however, the cathode is made substantially triangular in shape and bent in an arc and arranged as shown in Figs. 5 and 6, then the light 19 in position A of Fig. 11 will illuminate a large area E at the wide end of the cathode 10 and only a small area F when in position B. Similarly, Fig. 10 shows how the triangular cathode 10 of Figs. 7 and 8 will be illuminated. Hence, the electron emission and the resultant current will vary progressively as the apparent light position is moved. I employ this principle to determine the position and the relative distance of the beacon light being observed.

A photoemissive tube of this new type may be made as shown in Figs. 5 and 6, in which the cathode 10 is substantially triangular in shape, but preferably bent in a concave cylindrical arc, with its greatest width at the left hand side and tapering to a narrow width at the right hand side. The cathode may be rectangular or otherwise shaped and only a tapered area thereof may be coated with the light sensitive material; or opaque material may be applied to a standard cathode to give the desired tapered area that is light sensitive. The anode 21 may be shaped as a rectangular loop of wire so arranged as not to obstruct materially the passage of the light rays or to cast a wide shadow on the cathode. In this construction, the cathode 10 is suitably suspended from the top and connected to a cap 23 on the outside of the tube casing 24. The anode loop may be supported on a vertical wire connected to one of the prongs 25 which serve to mount the unit on the base, or the connections and supports may be reversed. The tube casing 24 may be a standard light transmitting envelope of glass, or if it is made of opaque material, it may comprise a light transmitting window.

Figures 7, 8:
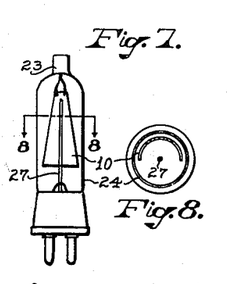
Fig. 7 is a vertical elevation of a modified form of my tube.
Fig. 8 is a section on the line 8—8 of Fig. 7.

The cathode 10 may be shaped and arranged as shown in Figs. 7 and 8 with its wider base portion at the bottom and its narrower portion at the top and bent in a concave arc with its axis parallel or coinciding with the axis of the substantially cylindrical tube casing 24. The anode 27 may be either a straight wire or a loop. The phototube of Fig. 5 operates with the axis of the tube casing 24 parallel with the long dimension of the aperture slot 4 in the wall 18 (Fig. 11) while the tube of Fig. 7 is arranged with the axis of the tube casing 24 perpendicular to the aperture slot (Fig. 10), so that the light beam may in each case travel from the wide to the narrow end of the triangular shape. The cathode in this special type of tube may be made similar to the cathode of a standard tube as above described, such as a silver plate coated with caesium on caesium oxide. I prefer that the photo tube carrying this triangularly shaped cathode be made the same as the standard phototube employed in my electric circuits, so that the differences in action between the two tubes will be governed solely by the area of the activated portion of each cathode.

This special type of photoemissive tube is employed to govern desired indicating or control apparatus that guides the aircraft or its pilot. This is preferably accomplished by applying a required voltage to the photoemissive tube so that when activated it will permit a current to flow. If a photovoltaic cell is used, it will generate current directly. Also, a photoconductive cell will require an applied current, and the current flow will depend on the resistance of the selenium or other element employed which varies with the amount of light striking its surface. This electrical signal is preferably amplified to insure satisfactory results under all atmospheric conditions, and this may be done by so arranging the phototube circuit that it controls the grid potential of an amplifier tube in a secondary power circuit which in turn operates or governs the guidance indicators or control apparatus.

In order that variations in light density caused by fog, snow, rain, dust and other atmospheric conditions may not affect materially the operation of the device, I prefer a construction in which my special type of phototube (Figs. 5 to 8) having a triangular cathode 10 is balanced against a standard tube having a rectangular cathode 9 (Fig. 3); and the parts are so arranged in electrical circuit that any variation in angular incidence of the light beam on the two balanced tubes gives a current variation that is related to that angle. Also, by employing two balanced phototubes, the variation in current which is proportional to the cosine of the angle of incidence of the light affects these two cathods alike, and thus that factor of a variable angle of illumination is cancelled or minimized.

Figures 12, 13:
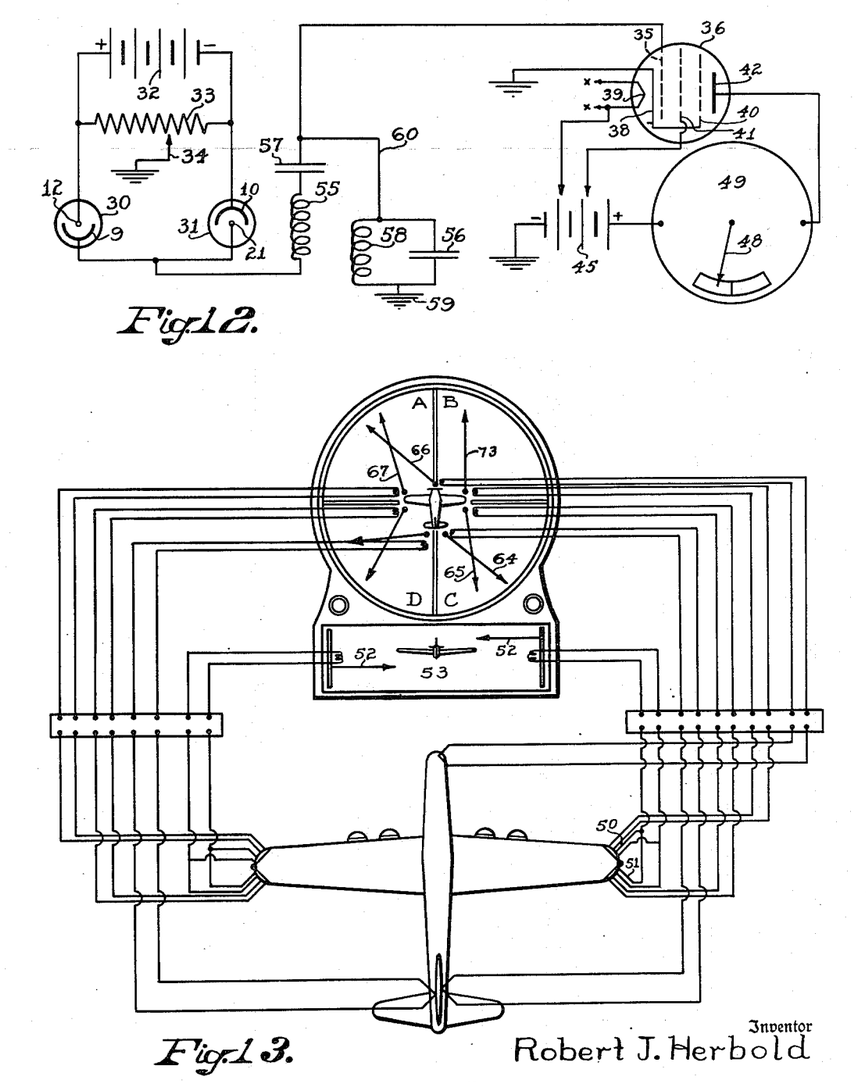
Fig. 12 is a wiring diagram of a preferred type of electric circuit for determining the direction of another craft.
Fig. 13 is a schematic wiring diagram of the various phototube circuits on the aircraft.

In its electric circuits, the device is comparatively simple. Referring first to Fig. 12, which shows the circuits for one of the distance and direction indicating needles in quadrants A, B, C and D of the circular dial of Fig. 13, I have balanced a standard vacuum phototube 30 having a rectangular cathode 9 (Fig. 3) against my special type of vacuum phototube 31 having a triangular cathode 10 (Figs. 5 and 7) by connecting the two tubes in series with a source of power in a bridge circuit so that one acts as the load for the other. Each of the tubes is so arranged on the aircraft that their cathodes point at the same angle toward the beacon light. A battery 32, or other suitable source of power, has its negative terminal connected to the specially shaped cathode 10 and its positive terminal connected to the anode 12 of the standard tube. A potentiometer resistance 33 connects across the terminals of the battery, and an adjustable contact 34 for the resistance is grounded into the framework of the aircraft. The vacuum phototubes are operated at saturation voltage and the maximum cathode emission for the weakest light condition and the current voltage characteristics are such that the circuit is very sensitive and the difference in light reception of the two cathodes gives a large change in voltage. That is, the cathode gives a saturation current under all normal conditions of use, and any variation in light intensity as caused by fog, rain or snow will not affect the indicator reading.

In this arrangement, if one tube receives more light than the other, its resistance decreases and the voltage distribution between the two tubes changes. That voltage variation in the phototube circuit is employed to vary the potential of a grid 35 of a suitable amplifying tube 36, such as the standard pentode illustrated diagrammatically in the drawings. The cathode 38 of the pentode is grounded to the framework as shown, and it is indirectly heated by a filament wire 39 to which A. C. or D. C. current is suitably applied. In this construction, a screen grid 40, connected to the cathode, and a suppressor grid 41 are located between the main grid 35 and the anode plate 42, and the parts are suitably mounted and arranged as is well understood. A battery 45 of suitable voltage is grounded at its negative terminal and connected as illustrated to supply the necessary current and potentials to the electrodes and grids of the amplifying tube 36. The parts are so constructed and arranged that when the potential of the grid 35, which is normally biased to a negative condition, is made less negative by the phototube circuit, the electron emission from the heated cathode 38 will be increased greatly and pass to the anode plate 42, and current derived from the battery 45 will flow and actuate the needle 48 of a milliammeter 49 of suitable construction, such as a galvanometer. The contact arm 34 of the potentiometer resistance may be adjusted to give the proper readings for a standard flight formation. For example, the potentiometer contact 34, as well as the amplifier circuit, is balanced to give a middle reading for the ammeter needle when the V-shaped cathode 10 of the special phototube receives light at about its middle portion G (Fig. 10) and thus gives an electron emission intermediate between the values obtained when the light beam activates the opposite ends of the cathode.

For indicating the altitude or relative vertical position of the observed craft, I may employ a similar circuit arrangement comprising two sets photo tubes located in each wing, one set pointing forward and the other to the rear. The wires from the forward set are connected in multiple with the wires 51 from the other set, as indicated in Fig. 13 so that only one needle 52 is called to indicate the relative altitude of a plane either in front or behind the observing plane on one side thereof. These needles 52 are suitably arranged on an instrument 53 of the D'Arsonval type of galvanometer. The needle may be bent at right angles near its outer end so that as it revolves about its pivot the needle travels parallel with itself over the indicator dial. This type of galvanometer is shown at 88 in Fig.

If desired, I may utilize flashing or chopped lights for the beacons 1 and 2 which flash at a known frequency, such as 600 cycles per minute, and in that case the electronic apparatus is tuned in to that frequency so as to eliminate the effects of stray light. The chopped or intermittently flashing light may be produced by placing in front of the light bulbs 1 and 2 a rotating disc provided with light apertures, which is rotated by a constant speed electric motor. Also, intermittent flashes can be obtained from a mercury arc type of light. To tune the receiving unit thereto, I may make use of a band pass filter of suitable construction. This may be located in the photo tube grid circuit and arranged to pass only a pulsating direct current. Such a filter, as shown in Fig. 12, may be located in the line leading to the grid 35. A standard type of filter comprises an inductance coil 55 in series and a condenser 56 in parallel which form a low pass filter, and a condenser 57 in series and an inductance coil 58 in parallel which form a high pass filter. The resonant circuit comprising the coil 58 and condenser 56 is grounded at 59 and connected by a wire 60 to the line leading from coil 55 and condenser 57 to the grid 35. The coil 55 offers but little impedance to a low frequency pulsating direct current and a high impedance to a high frequency current. The capacity 56 in parallel prevents the low frequency current from being shunted across the line. Similarly, the condenser 57 stops a non-pulsating direct current, but it does not impede a high frequency pulsating direct current; and the latter meets a high impedance in the shunt inductance 58. Suitable selections or adjustments of the inductances and capacities will tune the circuit as needed. When the flashing light is used, the medium phototube is activated intermittently and gives an instantaneous electron emission in synchronism with the chopped light, which results in a pulsating variation of the potential of amplifier grid 35. The indicating instruments 53 and 53 are of suitable construction, such as D'Arsonval galvanometer, for measuring the pulsating direct current. If desired, a vacuum tube amplifier may be inserted ahead of the diode to give a two stage amplification, and a band pass filter may be used with each amplifier. Many elaborations or modifications of this connection will be apparent to one skilled in electronics.

Referring now to Figs. 13 to 17 inclusive, I have there shown diagrammatically the arrangement of these various phototube circuits and the controlled instruments. One composite instrument seen by the aircraft pilot may comprise seven guidance needles (Fig. 13) arranged to give the approximate directional location of adjacent craft in any one of the four quadrants of the pilot's horizon. That is, the circular panel board may be divided into the quadrants A, B, C and D. The operation and construction in each of these quadrants is the same. For example, in the right hand rear quadrant C on aircraft II of Fig. 1, the light 1 of plane III is viewed by the rear right phototube 3 in the tail of craft II and by the rear phototube in the right wing of the same craft. The electrical apparatus is so constructed and arranged that one needle 64 of quadrant C (Fig. 13) points in an angular direction related to that of the line e between craft II and III of Fig. 1 and the other needle 65 takes a direction related to the direction f of Fig. 1. Thus, the point where the needles 64 and 65 cross may be considered as giving the location of the beacon 1, and the panel board may be so calibrated as to indicate the approximate distance of that beacon from the observing aircraft. Similarly, in the upper left hand quadrant A of aircraft II, the needle 66 gives the direction of the light 2 of craft I from the nose of plane II and the needle 67 gives the direction of the same light from the left hand wing phototube. Thus, the pilot of craft II can observe his position relative to the two crafts I and III in the formation and can guide his craft accordingly.

A single needle 66 (Fig. 13) may be pivoted centrally between quadrants A and B and arranged to swing into either quadrant. Hence, only seven instruments are shown. Each of the needles is governed by a separate phototube circuit of the type shown in Fig. 12. The double lines of Fig. 13 which lead from the instrument panel to the different parts of the plane indicate the arrangement and need not be further described. The panel 53 carries a zero mark shown as a silhouette of an airplane, and the positions of two needles 52 relative thereto indicates the altitude or relative position of an accompanying plane as to whether it is in the same or above or below the plane of the observing craft.

Figure 14:
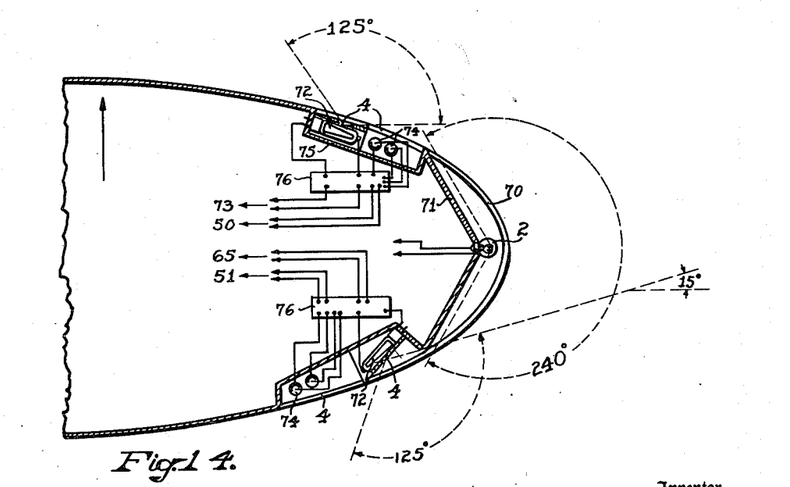
Fig. 14 is a diagrammatic fragmentary plan view, partly in section, of one wing showing the beacon light and the two sets of receiving phototubes.
Figure 15:
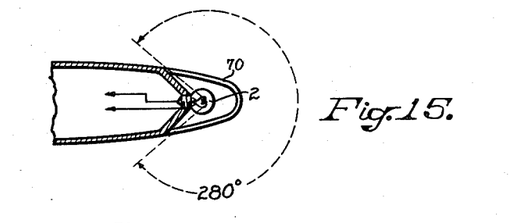
Fig. 15 is a fragmentary vertical section of the wing and its beacon light.

The constructional details may be as desired. As shown in Figs. 14 to 17, each of the light bulbs 1 and 2 may be suitably mounted and shielded in the tip ends of the wings. The electric light bulb may be protected by a suitable transparent wall 70 conforming properly with the outline of the wing, and shielding and supporting walls 71 are arranged to confine the light rays to the spherical angle of about 240° to 280°, as shown in Figs. 14 and 15. Electric current is suitably transmitted from a battery or an A. C. or D. C. dynamo.

In each of the wing tips (Figs. 14 and 15) and out of the path of the lights 1 and 2, I mount four pairs of the associated phototubes of Fig. 12, two pairs facing forward and the other two pairs pointing rearwardly. The two front phototubes 72, one behind the other, control the circuit for quadrant B needle 73 (Fig. 13) and the other two tubes 74 govern the altimeter needle 52. The slot 4 for tubes 72 is vertical and the walls are so spaced that these tubes pick up light rays within an angle of about 125° from a line running at right angles to the direction of travel. Thus these two tubes and the corresponding tubes in the other wing see all that is in front of the aircraft. It will also be noted that the tube sets 72 at the rear of the wing are arranged to pick up light rays which are 15 or 20 degrees outside of the 90° quadrant as indicated by the dotted lines and angle measurements, so that this overlapping prevents another plane from getting into a blind spot. The slot 4 for the other pair of tubes 74 is horizontal and arranged so that these tubes pick up aircraft above and below the observing craft within a suitable angle such as about 125°. These tubes and the corresponding ones pointing rearwardly (Fig. 14) are arranged to warn of danger of collision from craft flying at different levels. These tubes connect with circuits 50 and 51, and control needle 52. The two sets of tubes are suitably mounted within a receptacle 75, which may be gyroscopically supported so that it is not affected by lateral tilting of the plane or pitching thereof, and the gyroscopes and associated parts may be suitably constructed. The phototube amplifier apparatus is indicated by the rectangle 76.

Figure 16:
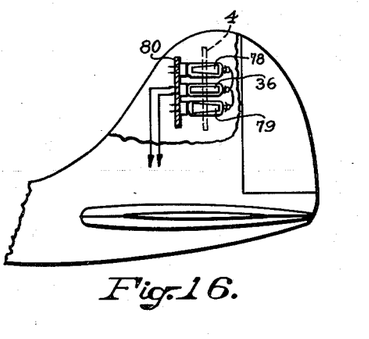
Fig. 16 is a fragmentary side elevation, partly in section, of the rudder section of the plane.
Figure 17:
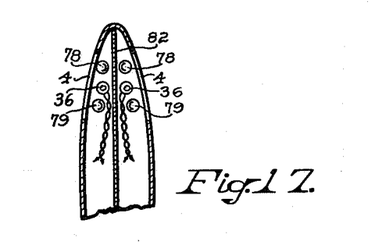
Fig. 17 is a fragmentary vertical section of the rudder section.

This same general construction is to be found at each side in the tail of the aircraft, as shown in Figs. 16 and 17 and the tubes and circuits in the nose may be similarly arranged. The phototubes having cathodes 78 and 79 and an associated amplifier tube 36 are suitably mounted on a panel board 80 and behind the narrow vertical slot 4 arranged to give a view of about 125° from the direction of flight, so that the two sets on the opposite sides of a partition 82 view all behind a center line perpendicular to the direction of travel. As shown in Fig. 13, the tail tubes govern the needle 64 in quadrant C and the corresponding needle in quadrant D. The other needle is governed from the rear wing tubes.

Figure 18:
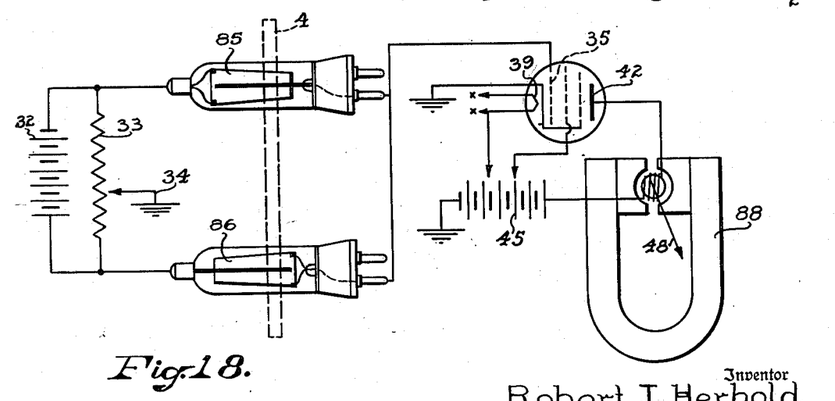
Fig. 18 is a diagrammatic view of a phototube amplifier circuit having a special photo tube construction.

A modification of the photo tube construction is shown in Fig. 18. That is, I may employ two photo tubes having their triangular or tapering cathodes 85 and 86 of the same shape and size but arranged with the tapers extending in reverse directions so that light passing through the slot 4 will activate equal areas of the two cathodes only when it reaches the central portions thereof. The rest of the construction may be made as above described, and either with or without a band pass filter. A D'Arsonval galvanometer 88 of standard construction is shown diagrammatically. Oblique light rays have a multiplied effect because of the reverse taper, since movement of the light ray up the two cathodes gives a reduced activation for one cathode and an increased activation for the other. This arrangement diminishes the effect of stray or ambient light, because the areas of the cathodes are equal and any variation in ambient light balances out. Various other arrangements may be employed, such as using the standard rectangular cathodes in association with two sets of opaque screens, one of which has a slot 4 as above described and the other of which has a tapered opening, similar to the tapered cathodes above described, so that as the light travels through the slot and thence through the tapered opening it activates a larger or smaller area, depending upon the angle of direction.

It may also be observed that the more distant or stray lights do not materially affect the readings of the instruments, since the predominating or closest light to the photo tube will largely control the cathode activation. That is, if one light is 50 feet from a pick up unit and another is 100 feet away, the latter will not affect the meter reading sufficiently to hamper the guidance of the aircraft, and particularly since it is not necessary to make accurate observations of distance or direction but merely to indicate zones of safe and unsafe operation and to provide warning signals which tell the pilot the approximate location of the accompanying craft.

In place of the photoemissive tubes above described, I may use a photoconductive cell comprising a selenium resistance which causes variation in a current derived from a battery. I may also use a photovoltaic element, such as a copper oxide cell or a "Weston" photronic cell for the electron emission. The photovoltaic cell has the advantage of not requiring any source of electric power. The light activated surface of the photovoltaic cell may have a triangular shape as above described. Similarly, that portion of the selenium cell which is to be activated by light may have an opaque screen providing the triangular shape, so that as the light angle changes the cell resistance will likewise change.

The size of the slot 4 depends on the sizes of the associated cathodes and their locations, but for a standard size of photo tube arranged close to the slot, I prefer that the width of the slot be about one-eighth of the height of the cathode so as to provide enough electron emission for more than a safe flying distance from the accompanying aircraft. A standard Mazda 50 candle power lamp gives enough infra red light to penetrate a dense cloud or rain or snowstorm and activate the phototubes at 1,000 feet or a far greater distance than needed for a flying formation. Also, various optical devices, such as collector lenses, may be employed to direct or to concentrate the light and to supplement the amplifier tube.

For the phototube, I may use a standard vacuum tube or a tube filled with argon or other gas. The amplifier tube is preferably of the vacuum type. Also, instead of batteries or a D. C. generator for the phototube amplifier circuit, I may use a source of alternating current, with a condenser connected between the phototubes and amplifier cathode, with one plate connected to the grid 35. Many changes in the circuit and the types of apparatus used will be readily apparent. I may use the apparatus of any of my above-mentioned prior applications for the present purposes, and thereby obtain an indication of the direction of the beacon light and its location and distance. Another suitable construction involves the use of a cathode tube activated by a phototube amplifier circuit, in which the direction or location of the beacon is shown as a light spot on a sensitive screen. In that case, the cathode tube can be swung to the required position of angularity just as the instrument needle is moved. It will also be understood that the apparatus above described may be simplified or made more complex, depending on its intended use.

In each of the constructions described, as well as those of said prior applications which are here usable when modified as herein set forth, I provide a guiding beacon, and preferably two, so located on one craft that the rays from one beacon may activate spaced photosensitive elements on another observing craft; and the photosensitive elements are so shielded that the right ones will pick up at one time only one beacon. The photosensitive elements, either directly or through an amplifier, provide current for an electric circuit connected with electrical apparatus, such as the indicators or milliammeters above described. A characteristic of that circuit, such as its amperage, is varied in a definite relation to the directive angularity of a light ray from the beacon to the photo element. In the constructions of the two first filed applications above mentioned, that electrical characteristic is the instantaneous value of a current at the time when the photo element is activated, as provided by varying a resistance according to that angular position of light activation so that the current value is related to that angularity and is translated as a measurement of distance or position. In the construction illustrated in the drawings, the current value depends on the angle of incidence of the light ray on the photo element. The angle between the lines of vision of two photo elements is translated by the calibrated instrument as the position or distance of the observed beacon.

It is to be understood that, in the description of this invention and in the claims, any variation in illumination and in the area of activated cathode surface which arises solely from the spreading of the light beam, which varies with the cosine of the angle of light incidence, is to be disregarded, since both phototubes are affected the same by the light falling on the two cathodes at the same angle. In that case, the more oblique the angle of incidence, the less is the illumination per unit area, and a narrow band of light will cover a greater area approaching infinity as the angle of incidence changes from a line perpendicular to the surface to parallelism therewith. Hence, the claims are to be interpreted as not referring to a variation in illumination caused by a change in the angle of incidence, but as referring to an increase or a decrease in electron emission caused respectively by an increase or decrease in the area of activation.

Since various modifications may be made in this invention within the knowledge of one skilled in the art, the above description is to be interpreted as an explanation of the principles of my invention and of preferred embodiments and not as imposing limitations on the claims appended hereto.

I claim:

1. Photoelectric position determining apparatus for craft comprising a pair of phototubes provided with light activated cathodes, a slotted shield which directs thereon a narrow ray of light from an observed beacon, the light activated surfaces of the two cathodes being tapered in a reverse arrangement so that a varying directive angularity of the beacon ray simultaneously activates a greater area on one cathode and a lesser area on the other, an amplifier tube having its grid potential governed by the voltage distribution between said tubes, and a positioning guidance device governed by the amplifier in accordance with a variation in the angularity of the beacon ray relative to the cathodes.

2. Craft positioning apparatus comprising a guiding beacon on one craft which is exposed to be seen from an observing craft, electronic apparatus including a pair of photosensitive elements and shields therefor mounted on the observing craft in definitely spaced positions where each element may be simultaneously activated by said beacon only during a limited change in angularity and distance of the beacon, two electrical direction indicating devices and circuits therefor associated respectively with said elements, means whereby each element and its shield provide a progressive variation in the activation of the element and an electrical characteristic of the associated circuit is varied progressively in a definite relation to a change in the directive angularity of the beacon ray to each activated element and the device indicates the direction of the beacon therefrom, and said indicating devices cooperating to triangulate the directions of the beacon from the related elements as the distance of the beacon from the craft.

3. Craft positioning apparatus according to claim 2 in which guiding beacons and shields therefor are mounted on the tips of the opposite wings of a craft where only one beacon may be seen at a time from an observing craft.

4. Craft positioning apparatus comprising a guiding beacon and a shield therefor mounted on a moving craft where the beacon may be seen from an observing craft, electronic apparatus including two spaced pairs of photo-sensitive elements in balanced circuits mounted on the observing craft in a definite spacing in a spherical quadrant where they may be simultaneously activated by a beacon anywhere in that quadrant, an electrical direction indicating device and a circuit therefor associated with each pair of elements, means including a shield for each element which provides a progressive variation in the activation of one of the elements of each pair and the unbalancing of their circuit and causes an electrical characteristic to be varied progressively in the circuit of each device in a definite relation to a change in the directive angularity of the beacon ray relative to the pair of elements and the device to indicate the direction of the beacon therefrom, the other element of each pair serving to balance out the effect of ambient light, said devices cooperating for triangulating the indicated directions of the beacon from the two spaced element positions as the distance of the beacon from the observing craft.

5. Craft positioning apparatus comprising a guiding beacon on one craft which is exposed to be seen from an observing craft, two pairs of definitely spaced photosensitive elements mounted on the observing craft, one pair of the spaced elements being arranged for simultaneously observing the beacon in a definite spherical quadrant and another pair of spaced elements being mounted for simultaneously observing the beacon only in the adjacent quadrant, shields and mounts for the elements which permit the beacon to activate the elements of each of the pairs successively but continuously as the angularity of the beacon changes through the two quadrants, a single indicating instrument having a separate electrical direction indicating device and a circuit therefor associated respectively with each of the elements in each quadrant, said instrument having quadrants corresponding with and identifying the quadrant of each element and its associated device, means whereby each element and its associated shield provide a progressive variation in the activation of the element and an electrical characteristic of the associated circuit is varied progressively in a definite relation to a change in the directive angularity of the beacon ray to each activated element and the associated device indicates the direction of the beacon therefrom and identifies the quadrant, said indicating devices cooperating to triangulate the directions of the beacon therefrom as the distance of the beacon from the craft.

6. Craft positioning apparatus comprising a guiding beacon exposed on a moving craft to be seen from an observing aircraft, a photosensitive element and a shield therefor mounted on the observing craft where the element may be activated by light from the beacon within a spherical quadrant intersected by a horizontal plane, means whereby the element and shield provide a progressive variation in the activation of the element in a definite relation to a variation in the directive angularity of the beacon light in a vertical plane, an electrical direction indicating device including a circuit, and means including amplifying apparatus governed by the variable activation of said element which varies an electrical characteristic in said circuit in response to said change in directive angularity and causes said device to indicate the position of the beacon relative to said horizontal plane.

7. Craft positioning apparatus comprising a guiding beacon exposed on a moving craft to be seen from an observing craft, two photosensitive elements and shields therefor mounted on the observing craft in definitely spaced positions where both elements may be simultaneously activated by said beacon anywhere in a limited spherical angle at one side of the craft during a change in angularity and distance of the beacon, a third photosensitive element and a shield therefor arranged to be activated simultaneously by said beacon within the spherical angle and on both sides of a horizontal plane, separate amplifiers and circuits governed by each element, an electrical direction indicating device and a circuit therefor associated with each element and its amplifier, and means whereby each element and its shield provide a progressive variation in the element activation and an electrical characteristic in the circuit of its indicating device is progressively varied in a definite relation to a change in the directive angularity of the beacon ray to the element so that each device indicates the direction of the beacon, said indicating devices serving for triangulating the indicated directions as the distance of the beacon and serving to give the relative vertical position of the beacon carrying craft.

8. Apparatus according to claim 7 in which the photosensitive elements and associated shields are shaped to provide a variation in the area of activation of each element as the directive angularity of the light changes and the associated amplifier is governed by the varation in activation.

9. Photoelectric apparatus governed according to a variation in the directive angularity of a light ray comprising a pair of laterally spaced photocells which are provided with light sensitive elements facing in the same direction, the light activated areas of the elements being tapered in a reverse arrangement with their directions of taper spaced and parallel, a shield having a narrow slot arranged perpendicular to said directions of taper which directs a ray of light of uniform width simultaneously onto each of the elements as the light angle changes so that a variation in angularity of the ray progressively activates a greater area of one element and a lesser area of the other, an amplifier tube having its grid potential governed by the differential activation of the photocells, and an electrical device governed by the amplifier in accordance with the angularity of the light ray relative to the two elements.

ROBERT J. HERBOLD.

REFERENCES CITED

The following references are of record in the file of this patent:

UNITED STATES PATENTS

| Number | Name | Date |
|---|---|---|
| 1,149,122 | Fuller | Aug. 3, 1915 |
| 1,387,850 | Hammond | Aug. 16, 1921 |
| 1,936,400 | Langmuir | Nov. 21, 1933 |
| 1,954,329 | Schoenberg | Apr. 10, 1934 |
| 2,077,398 | Clark | Apr. 20, 1937 |
| 2,147,156 | Geffcken et al. | Feb. 14, 1939 |
| 2,188,293 | Williams | Jan. 23, 1940 |
| 2,206,036 | Herson | July 2, 1940 |
| 2,216,716 | Withem | Oct. 1, 1940 |
| 2,220,181 | Steudel et al. | Nov. 5, 1940 |
| 2,234,329 | Wolff | Mar. 11, 1941 |
| 2,350,820 | Rettinger | June 6, 1944 |
| 2,366,939 | Smith et al. | Jan. 9, 1945 |